(12) United States Patent
Kang et al.

(10) Patent No.: US 7,551,363 B2
(45) Date of Patent: Jun. 23, 2009

(54) FIXED-FOCUS LENS

(75) Inventors: Yi-Hao Kang, Hsinchu (TW); Hsin-Te Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/053,266

(22) Filed: Mar. 21, 2008

(65) Prior Publication Data

US 2009/0015943 A1    Jan. 15, 2009

(30) Foreign Application Priority Data

Jul. 12, 2007    (TW) .............................. 96125387 A

(51) Int. Cl.
 *G02B 3/00* (2006.01)
 *G02B 13/04* (2006.01)
 *G02B 3/02* (2006.01)

(52) U.S. Cl. ........................ 359/651; 359/663; 359/726; 359/753; 359/708; 359/716; 359/784

(58) Field of Classification Search ......... 359/649–651, 359/663, 726, 749–753, 708, 713–716, 784
See application file for complete search history.

(56) References Cited

U.S. PATENT DOCUMENTS

| 6,144,503 | A | 11/2000 | Sugano |
| 6,476,981 | B1 | 11/2002 | Shikama |
| 6,563,650 | B2 | 5/2003 | Moskovich |
| 2007/0268598 | A1* | 11/2007 | Kang et al. .................. 359/716 |

FOREIGN PATENT DOCUMENTS

TW    I284747    8/2007

\* cited by examiner

*Primary Examiner*—Evelyn A. Lester
(74) *Attorney, Agent, or Firm*—J.C. Patents

(57) ABSTRACT

A fixed-focus lens including a first lens group, a second lens group and a third lens group which are arranged in sequence from an object side to an image side is provided. The first lens group has a negative refractive power and includes a first lens and a second lens arranged in sequence from the object side to the image side, and both having negative refractive powers. The first lens is an aspheric lens. The second lens group has a positive refractive power and includes a lens with positive refractive power. The third lens group has a positive refractive power and includes at least one first cemented lens. The fixed-focus lens satisfies $1.2<|f_{G1}/f|<4.2$ and $2.8<|f_{L2}/f|<8.6$, where f, $f_{G1}$ and $f_{L2}$ are effective focal lengths of the fixed-focus lens, the first lens group and the second lens respectively.

21 Claims, 18 Drawing Sheets

US 7,551,363 B2

FIXED-FOCUS LENS

CROSS-REFERENCE TO RELATED APPLICATION

This application claims the priority benefit of Taiwan application serial no. 96125387, filed on Jul. 12, 2007. The entirety of the above-mentioned patent application is hereby incorporated by reference herein and made a part of this specification.

BACKGROUND OF THE INVENTION

1. Field of the Invention

The present invention generally relates to a lens, and more particularly to a fixed-focus lens.

2. Description of Related Art

FIG. 1 is a structural diagram of a conventional fixed-focus lens applied to a rear projection system as disclosed in U.S. Pat. No. 6,563,650. Referring to FIG. 1, the fixed-focus lens 100 includes a first lens group 110, a second lens group 120 and a third lens group 130 arranged in sequence from an object side to an image side. A light valve 50 is disposed on the image side. The first lens group includes four lenses 112, 114, 116 and 118. The second lens group 120 includes four lenses 122, 124, 126 and 128. The third lens group 130 includes five lenses 132, 134, 136, 138 and 139.

Because the conventional fixed-focus lens 100 uses a greater number of lenses, the production cost is also higher. In addition, the greater number of lenses also increases the overall length of the fixed-focus lens 100. Thus, when the fixed-focus lens 100 is applied to a rear projection television (RPTV), the RPTV will have a greater thickness. However, reducing the thickness of the RPTV will lead to various phenomena that affect the imaging quality such as an increase in the optical imaging aberration or even the appearance of ghost image.

SUMMARY OF THE INVENTION

Accordingly, the present invention provides a fixed-focus lens having the advantages of smaller volume, better imaging quality and lower production cost.

Other advantages of the present invention are disclosed through the technical features described below.

To achieve one of, parts of or all of the advantages or other advantages, an embodiment of the present invention provides a fixed-focus lens including a first lens group, a second lens group and a third lens group. The first lens group has a negative refractive power and includes a first lens and a second lens arranged in sequence from the object side to the image side. Both the first lens and the second lens have negative refractive powers, and the first lens is an aspheric lens. The second lens group is disposed between the first lens group and the image side and has a positive refractive power. The second lens group includes a third lens having a positive refractive power. The third lens group is disposed between the second lens group and the image side and has a positive refractive power. The third lens group includes at least one first cemented lens. In addition, the fixed-focus lens satisfies the two following conditions: (i) $1.2<|f_{G1}/f|<4.2$; and (ii) $2.8<|f_{L2}/f|<8.6$, where $f_{G1}$ is the effective focal length (EFL) of the first lens group, $f_{L2}$ is the EFL of the second lens, and f is the EFL of the fixed-focus lens.

Because the fixed-focus lens is able to eliminate aberration with fewer lenses, good imaging quality can be obtained by using the fixed-focus lens with a smaller volume. Moreover, the production cost is effectively lowered because the total number of lenses in the fixed-focus lens is reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
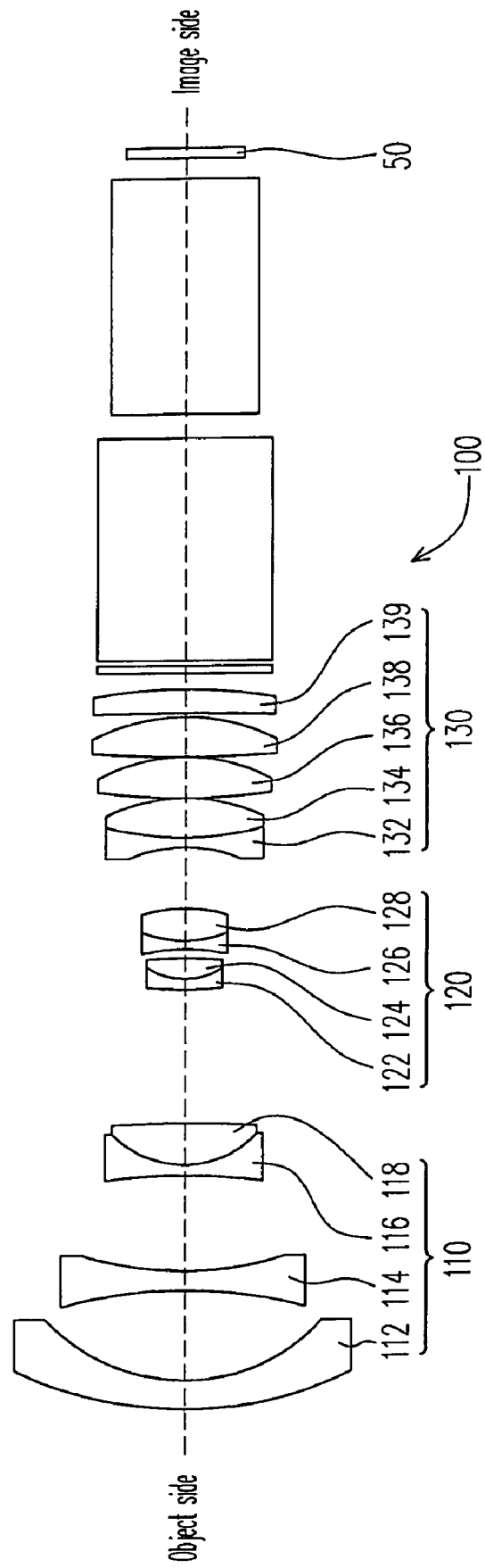
FIG. 1 is a structural diagram of a conventional fixed-focus lens applied to a rear projection system.

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
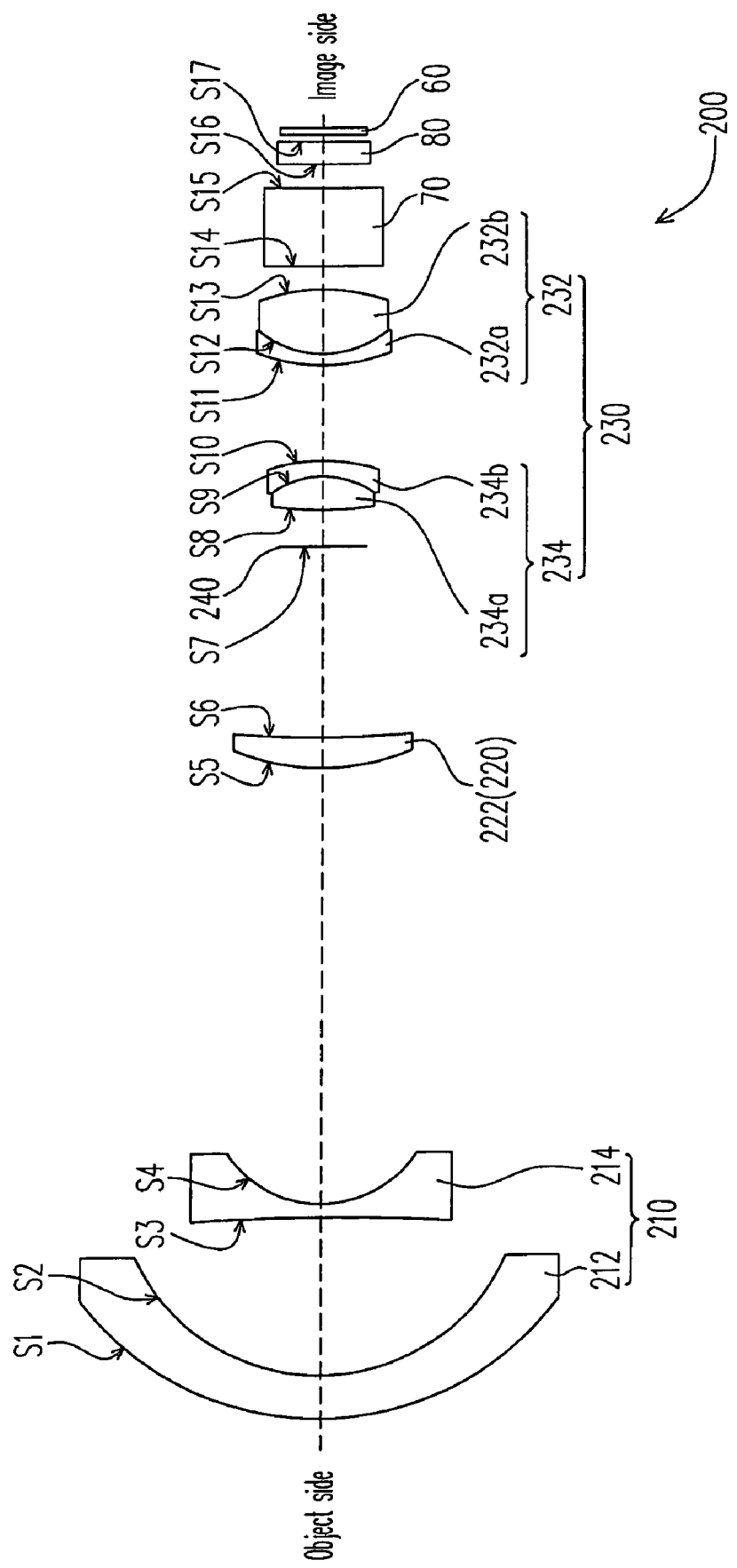
FIG. 2 is a structural diagram of a fixed-focus lens according to an embodiment of the present invention.

As shown in FIG. 2, the fixed-focus lens 200 in an embodiment of the present invention includes a first lens group 210, a second lens group 220 and a third lens group 230. The first lens group 210 has a negative refractive power and includes a first lens 212 and a second lens 214 arranged in sequence from an object side to an image side. Both the first lens 212 and the second lens 214 have negative refractive powers. Furthermore, the first lens 212 is an aspheric lens. In the present embodiment, the first lens 212 is a meniscus lens with a convex surface facing the object side, for example. In addition, the second lens 214 is a biconcave lens, for example.

The second lens group 220 is disposed between the first lens group 210 and the image side and has a positive refractive power. The second lens group 220 includes a third lens 222 having a positive refractive power. In the present embodiment, the third lens 222 is a meniscus lens having a convex surface facing the object side, for example.

The third lens group 230 is disposed between the second lens group 220 and the image side and has a positive refractive power. The third lens group 230 includes at least one first cemented lens 232. In the present embodiment, the third lens group 230 further includes a second cemented lens 234 located between the second lens group 220 and the first cemented lens 232. In addition, the fixed-focus lens 200 satisfies the two following conditions: (i) $1.2<|f_{G1}/f|<4.2$; (ii) $2.8<|f_{L2}/f|<8.6$, where $f_{G1}$ is the effective focal length (EFL) of the first lens group 210, $f_{L2}$ is the EFL of the second lens group 214, and f is the EFL of the fixed-focus lens 200. Furthermore, an image-processing device 60 can be disposed on the image side, and the image-processing device 60 in the present embodiment is a light valve, for example. In the present embodiment, the fixed-focus lens 200 is capable of forming the image provided by the image-processing device 60 on the object side.

More particularly, the first cemented lens 232 includes, for example, a fourth lens 232a and a fifth lens 232b arranged in sequence from the object side to the image side. The fourth lens 232a has a negative refractive power and the fifth lens 232b has a positive refractive power, for example. In the present embodiment, the fourth lens 232a is a meniscus lens having a convex surface facing the object side, and the fifth lens 232b is a biconvex lens, for example.

Furthermore, the second cemented lens 234 includes a sixth lens 234a and a seventh lens 234b arranged in sequence from the object side to the image side. The sixth lens 234a has a positive refractive power, and the seventh lens 232b has a negative refractive power, for example. In the present embodiment, the sixth lens 234a is a biconvex lens, and the seventh lens 234b is a meniscus lens having a convex surface facing the image side, for example.

In addition, the fixed-focus lens 200 in the present embodiment may further include an aperture stop 240 disposed between the second lens group 220 and the third lens group 230.

The fixed-focus lens 200 in the present embodiment utilizes an aspheric lens (that is, the first lens 212) together with six other lenses (that is, the second lens 214 to the seventh lens 234b) to eliminate the effect of aberration and produce good imaging quality. Compared with the conventional fixed-focus lens 100 (as shown in FIG. 1) having thirteen lenses, the number of the lenses adopted in the fixed-focus lens 200 according to the present embodiment is less, such that the material cost is reduced. Moreover, the other lenses besides the first lens 212 may be spherical lenses, so that the overall cost of the fixed-focus lens 200 is further reduced. Additionally, by using a smaller number of lenses in the fixed-focus lens 200, overall volume of the fixed-focus lens 200 is reduced. Therefore, when the fixed-focus lens 200 is applied to a RPTV, overall volume of the RRTV can be reduced.

To further ensure the imaging quality, the fixed-focus lens 200 of the present embodiment may satisfy at least one of the four conditions: (iii) $6.8<|f_{G2}/f|<18.0$; (iv) $4.0<|f_{G3}/f|<6.3$; (v) $27<|V_P-V_n|<55$; (vi) $0.24<|N_p-N_n|<0.33$, where $f_{G2}$ is the EFL of the second lens group 220, and $f_{G3}$ is the EFL of the third lens group 230. In addition, $V_P$ is the Abbe number of the lens having a positive refractive power in the first cemented lens 232 or the second cemented lens 234, and $V_n$ is the Abbe number of the lens having a negative refractive power in the first cemented lens 232 or the second cemented lens 234. The condition (v) is applicable for both the first cemented lens 232 and the second cemented lens 234. For example, in the first cemented lens 232, $V_P$ is the Abbe number of the fifth lens 232b, and $V_n$ is the Abbe number of the fourth lens 232a. Furthermore, $N_p$ is the refractive index of the lens having a positive refractive power in the first cemented lens 232 or the second cemented lens 234, and $N_n$ is the refractive index of the lens having a negative refractive power in the first cemented lens 232 or the second cemented lens 234. The condition (vi) is applicable for both the first cemented lens 232 and the second cemented lens 234. For example, in the first cemented lens 232, $N_p$ is the refractive index of the fifth lens 232b, and $N_n$ is the refractive index of the fourth lens 232a.

In the following, an embodiment of the fixed-focus lens 200 is provided. However, it should be noted that the numbers and data listed in Table 1 and Table 2 below are not used to limit the present invention. Anyone skilled in the art may modify some of the parameters or settings after referencing the present invention. Yet, the modified version is still considered to be within the scope of the present invention.

TABLE 1

| Surface | Radius of Curvature (mm) | Interval (mm) | Refractive Index | Abbe Number | Remarks |
|---|---|---|---|---|---|
| S1 | 72.065 | 5.52 | 1.49 | 57.4 | First lens |
| S2 | 22.487 | 20.30 | | | |
| S3 | −381.932 | 1.84 | 1.74 | 49.3 | Second lens |
| S4 | 14.974 | 56.12 | | | |
| S5 | 30.988 | 3.54 | 1.72 | 38.0 | Third lens |
| S6 | 137.156 | 24.29 | | | |
| S7 | Infinite | 5.88 | | | Aperture Stop |
| S8 | 70.074 | 4.21 | 1.49 | 70.4 | Sixth lens |
| S9 | −11.748 | 1.98 | 1.81 | 33.3 | Seventh lens |
| S10 | −23.884 | 13.54 | | | |
| S11 | 25.142 | 1.38 | 1.76 | 27.5 | Fourth lens |
| S12 | 13.696 | 8.09 | 1.49 | 70.4 | Fifth lens |

TABLE 1-continued

| Surface | Radius of Curvature (mm) | Interval (mm) | Refractive Index | Abbe Number | Remarks |
|---|---|---|---|---|---|
| S13 | −22.802 | 1.94 | | | |
| S14 | Infinite | 10.00 | 1.52 | 64.2 | Total internal reflection prism |
| S15 | Infinite | 3.00 | | | |
| S16 | Infinite | 3.00 | 1.49 | 70.4 | Cover glass |
| S17 | Infinite | 0.48 | | | |

In Table 1, the interval is a straight distance along the main optical axis between two adjacent surfaces. For example, the interval of the surface S1 is the straight distance along the main optical axis between the surface S1 and the surface S2. The values of thickness, refractive index and Abbe number of the lenses as indicated in the remark field can be found in the same row. In Table 1, the surfaces S1 and S2 are the two surfaces of the first lens 212, the surfaces S3 and S4 are the two surfaces of the second lens 214, the surfaces S5 and S6 are the two surfaces of the third lens 222, and the surface S7 is the aperture stop 240. The surface S8 is the surface of the sixth lens 234a facing the object side, the surface S9 is the connected surface between the sixth lens 234a and the seventh lens 234b, and the surface S10 is the surface of the seventh lens 234b facing the image side. The surface S11 is the surface of the fourth lens 232a facing the object side, the surface S12 is the connected surface between the fourth lens 232a and the fifth lens 232b, and the surface S13 is the surface of the fifth lens 232b facing the image side. The surfaces S14 and S15 are the two surfaces of a total internal reflection (TIR) prism 70, the surfaces S16 and S17 are the two surfaces of a cover glass 80 for protecting the image-processing device 60. The interval value located in the row in which the surface S17 is located is the interval between the surface S17 and the image-processing device 60.

The parameters such as radius of curvature and interval of each surface can be found in Table 1, which will not be repeated herein.

The surfaces S1 and S2 are aspheric surfaces, which can be represented by the following formula:

$$Z = \frac{cr^2}{1+\sqrt{1-(1+k)c^2r^2}} + A_1 r^2 + A_2 r^4 + A_3 r^6 + A_4 r^8 + A_5 r^{10} + \ldots$$

In the above formula, Z is the sag in the direction of the optical axis, and c is the reciprocal of the radius of the osculating sphere, that is, the reciprocal of the radius of curvature (i.e. the radius of curvature of surfaces S1 and S2 in Table 1) close to the optical axis. k is the conic coefficient, r is the aspheric height, that is, the height from the center of the lens to its edge, and $A_1, A_2, A_3, A_4, A_5 \ldots$ are aspheric coefficients, wherein the coefficient $A_1$ is 0. Table 2 lists the parameters of the surfaces S1 and S2.

TABLE 2

| Aspheric Parameters | Conic Coefficient k | Coefficient $A_2$ | Coefficient $A_3$ | Coefficient $A_4$ | Coefficient $A_5$ |
|---|---|---|---|---|---|
| S1 | −78.2722 | 2.707137E−05 | −2.742295E−08 | 1.452793E−11 | −8.520586E−16 |
| S2 | −7.20955 | 6.415367E−05 | −4.696068E−08 | −8.261424E−11 | 7.961801E−14 |

Accordingly, in the fixed-focus lens 200 of the present embodiment, f=5.193 mm, $f_{G1}$=−12.312 mm, $f_{G2}$=54.269 mm, $f_{G3}$=26.882 mm, $f_{L2}$=−19.266, $|f_{G1}/f|$=2.371, $|f_{G2}/f|$=10.45, $|f_{G3}/f|$=5.177, $|f_{L2}/f|$=3.701, 37.2<$|V_p-V_n|$<42.9 and 0.27<$|N_p-N_n|$<0.32.

Figure 3A:
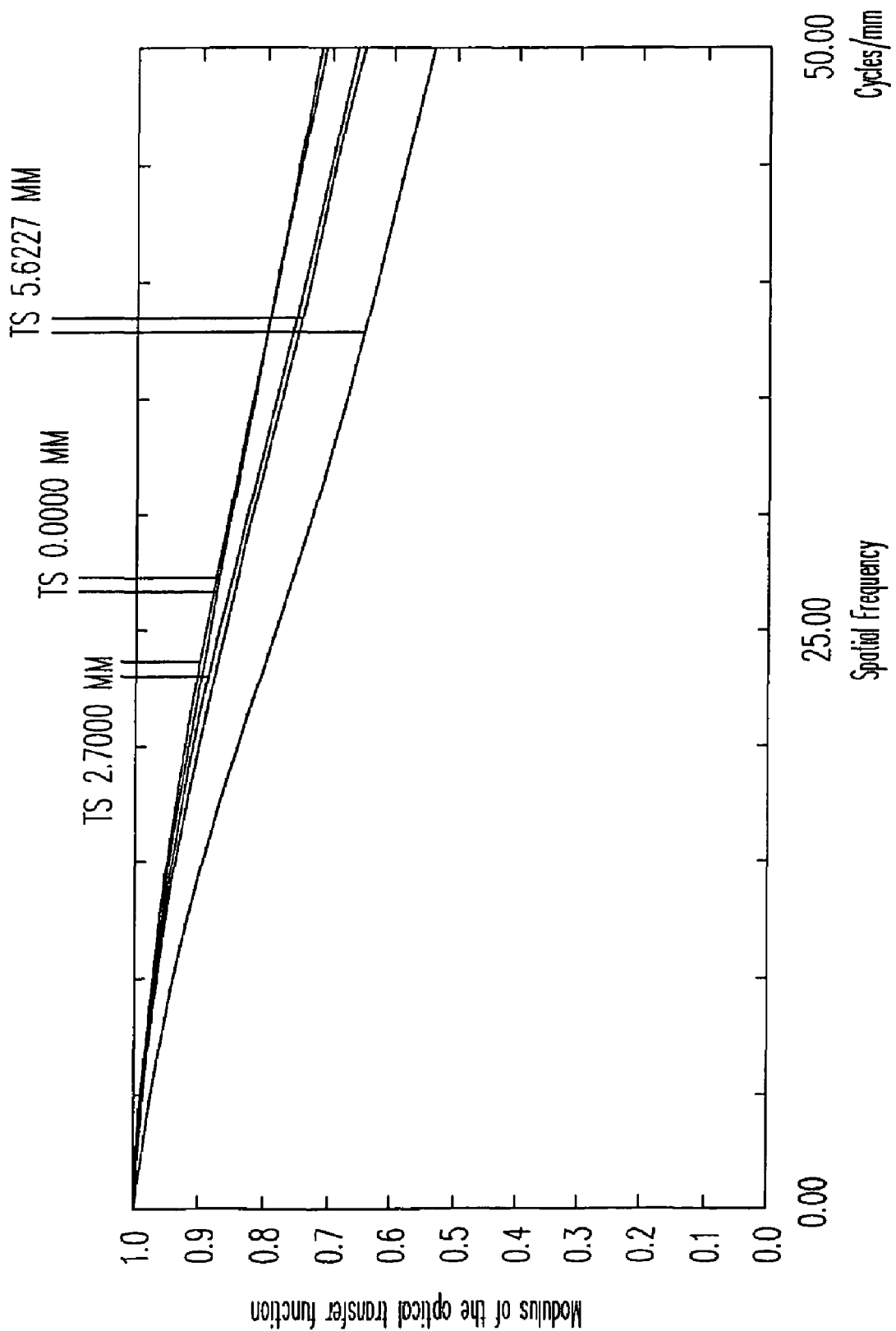
FIGS. 3A to 3C are diagrams showing simulated optical imaging data of the fixed-focus lens in FIG. 2.
Figure 3B:
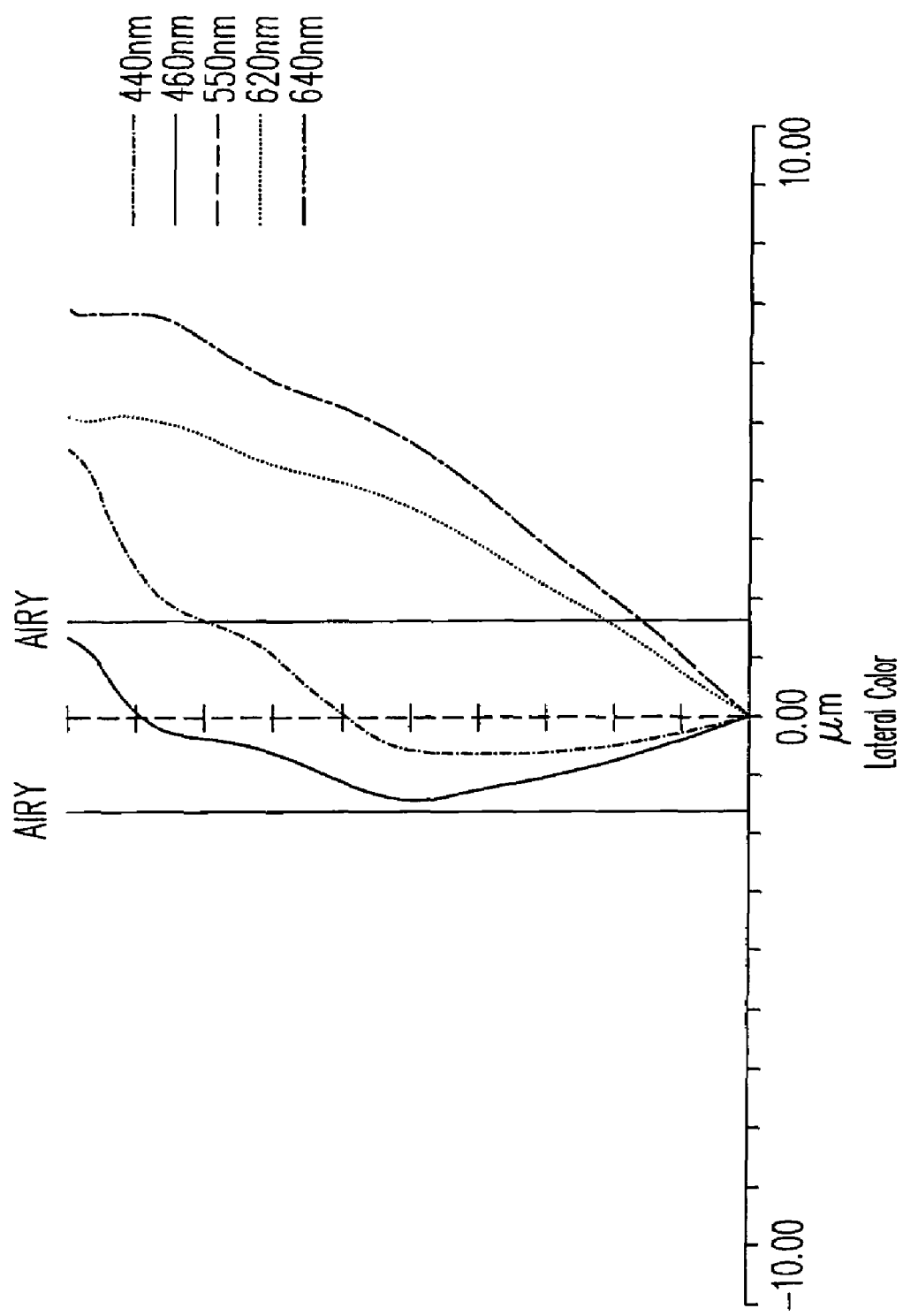
Figure 3C:
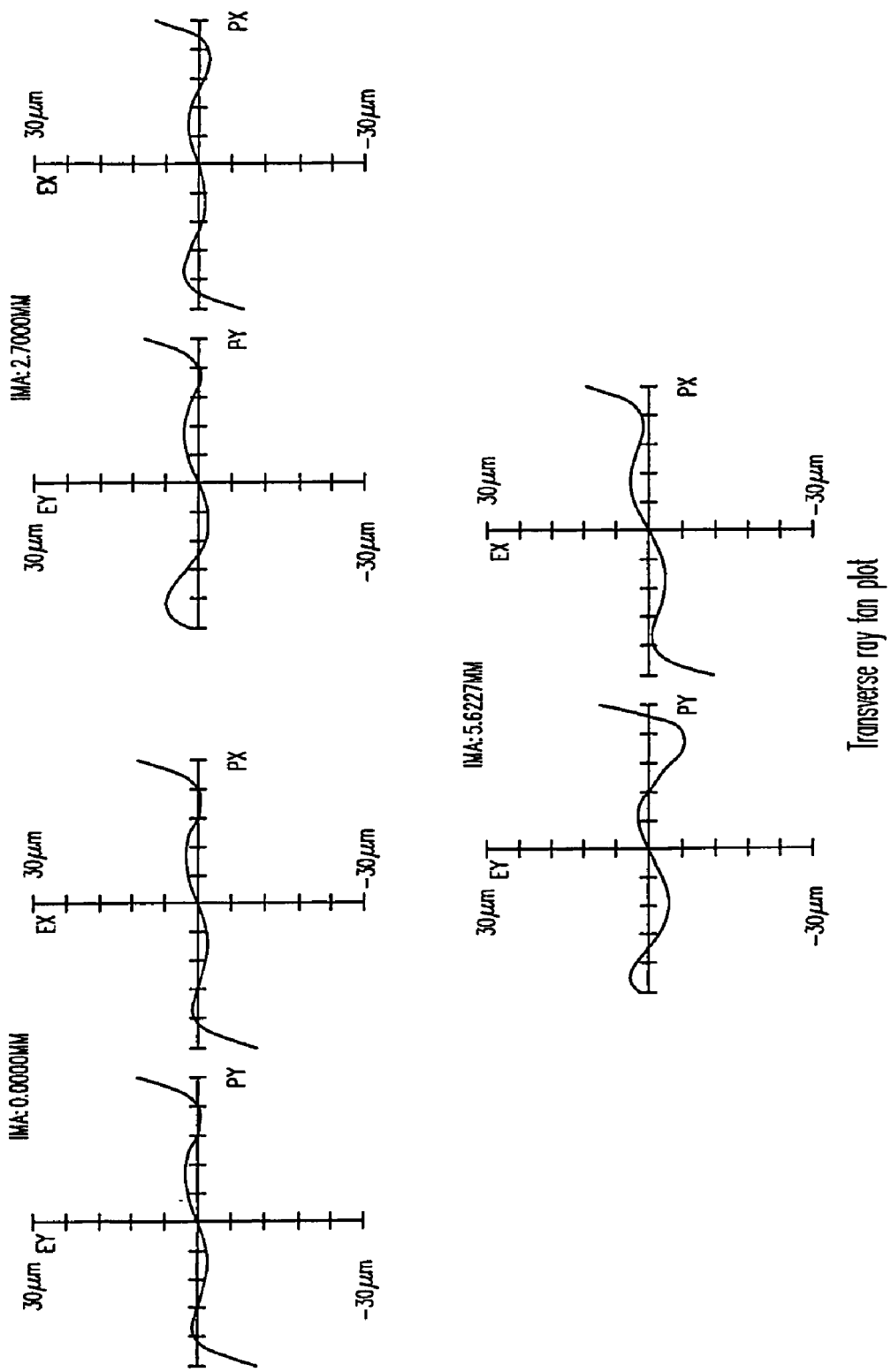

Refer to FIGS. 3A through 3C. FIG. 3A is a graph with modulation transfer function (MTF) curves, wherein the horizontal axis is the spatial frequency in cycles per millimeter (mm), and the vertical axis is the modulus of the optical transfer function (OTF). The simulated data in FIG. 3A is performed by using light having a wavelength between 440 nm 640 nm. FIG. 3B is a lateral color diagram of the image, in which the maximum field is 5.6227 mm, and the reference wavelength is 550 nm. FIG. 3C is a transverse ray fan plot of the image. Because the curves displayed in FIGS. 3A to 3C are within the standard range, the fixed-focus lens 200 of the present embodiment can produce good imaging quality with fewer lenses compared with the conventional technique.

Figure 4:
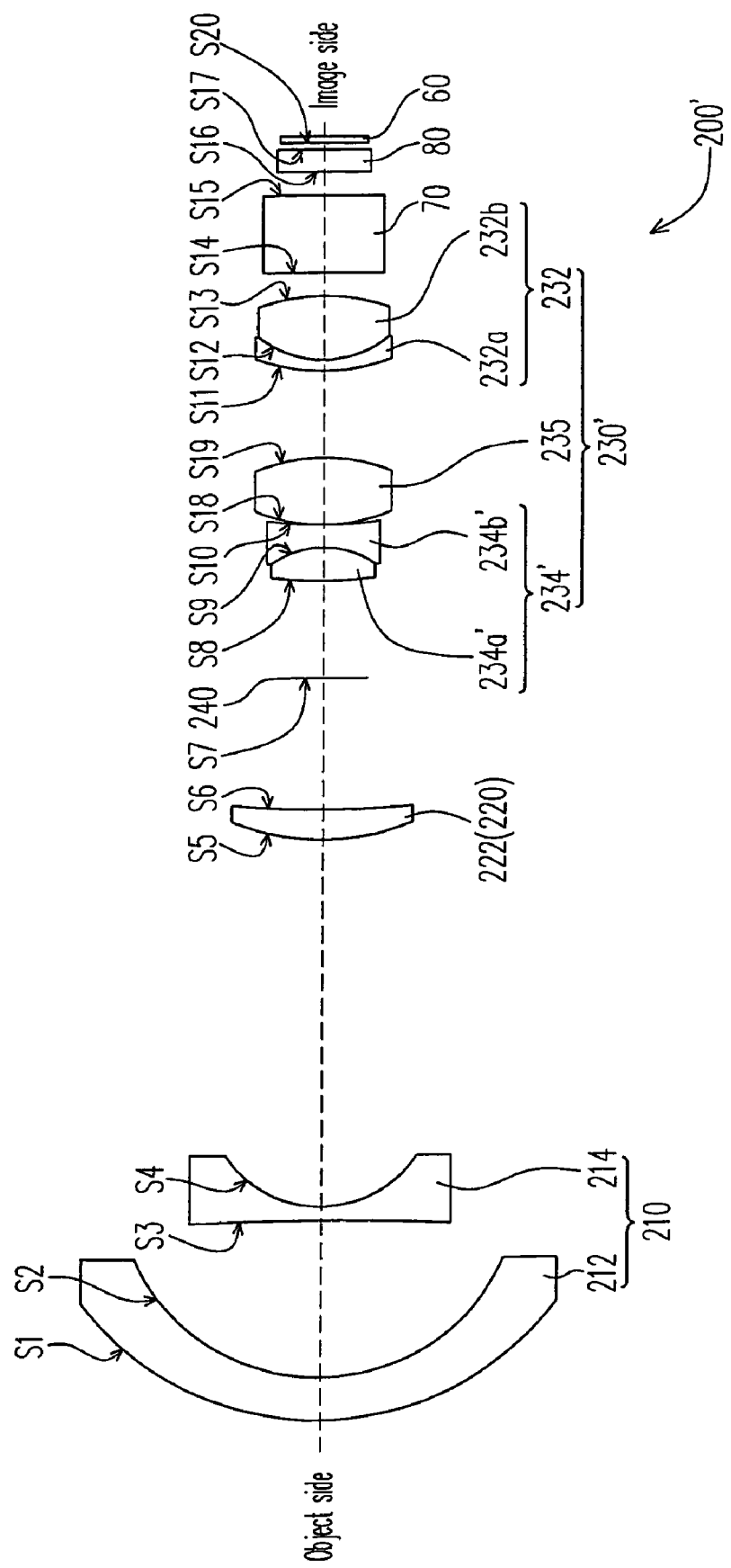
FIG. 4 is a structural diagram of a fixed-focus lens according to another embodiment of the present invention.

FIG. 4 is a structural diagram of a fixed-focus lens according to another embodiment of the present invention. The fixed-focus lens 200' in the present embodiment is similar to the fixed-focus lens 200 (referring to FIG. 2) except for the following differences. In the fixed-focus lens 200', a third lens group 230' has an additional eighth lens 235 disposed between a second cemented lens 234' and the first cemented lens 232. The eighth lens 235 has a positive refractive power, for example. In the present embodiment, the eighth lens 235 is a biconvex lens, for example.

In the fixed-focus lens 200', the second cemented lens 234' includes a sixth lens 234a' and a seventh lens 234b' arranged in sequence from the object side to the image side. The sixth lens 234a' has a positive refractive power, and the seventh lens 234b' has a negative refractive power, for example. In the present embodiment, the sixth lens 234a' is a biconvex lens, and the seventh lens 234b' is a biconcave lens, for example. The fixed-focus lens 200' in the present embodiment also has the advantages and effects of the foregoing fixed-focus lens 200 (referring to FIG. 2).

In the following, an embodiment of the fixed-focus lens 200' is provided. However, the embodiment is not intended to limit the present invention. Refer to FIG. 4, Table 3 and Table 4.

TABLE 3

| Surface | Radius of Curvature (mm) | Interval (mm) | Refractive Index | Abbe Number | Remarks |
|---|---|---|---|---|---|
| S1 | −3254.168 | 5.11 | 1.49 | 57.4 | First lens |
| S2 | 27.025 | 23.66 | | | |
| S3 | −71.941 | 2.37 | 1.64 | 55.4 | Second lens |
| S4 | 17.720 | 43.73 | | | |
| S5 | 29.748 | 3.57 | 1.72 | 38.0 | Third lens |
| S6 | 179.575 | 18.45 | | | |
| S7 | Infinite | 8.67 | | | Aperture Stop |
| S8 | 33.838 | 6.55 | 1.49 | 70.4 | Sixth lens |
| S9 | −12.116 | 4.63 | 1.81 | 33.3 | Seventh lens |
| S10 | 55.120 | 0.51 | | | |

TABLE 3-continued

| Surface | Radius of Curvature (mm) | Interval (mm) | Refractive Index | Abbe Number | Remarks |
|---|---|---|---|---|---|
| S18 | 31.979 | 9.21 | 1.69 | 31.2 | Eighth lens |
| S19 | −30.017 | 3.97 | | | |
| S11 | 21.926 | 1.32 | 1.76 | 27.5 | Fourth lens |
| S12 | 11.168 | 7.23 | 1.50 | 81.6 | Fifth lens |
| S13 | −60.321 | 4.47 | | | |
| S14 | Infinite | 10.00 | 1.52 | 64.2 | Total internal reflection prism |
| S15 | Infinite | 3.00 | | | |
| S16 | Infinite | 3.00 | 1.49 | 70.4 | Cover glass |
| S17 | Infinite | 0.48 | | | |
| S20 | Infinite | | | | Image-processing device |

TABLE 4

| Aspheric Parameters | Conic Coefficient k | Coefficient $A_2$ | Coefficient $A_3$ | Coefficient $A_4$ | Coefficient $A_5$ |
|---|---|---|---|---|---|
| S1 | 10.012 | 2.228056E−05 | −2.476866E−08 | 1.540042E−11 | −2.998166E−15 |
| S2 | −7.71343 | 5.779560E−05 | −4.443984E−08 | −8.002390E−12 | 1.012098E−14 |

In table 3, the surfaces S1~S7 and S11~S17 are the same as those in Table 1. The surface S8 is the surface of the sixth lens 234a' facing the object side, the surface S9 is the connected surface between the sixth lens 234a' and the seventh lens 234b', and the surface S10 is the surface of the seventh lens 234b' facing the image side. The surfaces S18 and S19 are the two surfaces of the lens 235. The surface S20 is the active surface of the image-processing device 60. In addition, the coefficient $A_1$ not listed in Table 4 is 0.

Accordingly, in the fixed-focus lens 200' of the present embodiment, f=5.73 mm, $f_{G1}$=−11.79 mm, $f_{G2}$=48.526 mm, $f_{G3}$=27.241 mm, $f_{L2}$=−21.954, $|f_{G1}/f|$=2.058, $|f_{G2}/f|$=8.469, $|f_{G3}/f|$=4.754, $|f_{L2}/f|$=3.831, 37.2<$|V_p-V_n|$<54.1 and 0.26<$|N_p-N_n|$<0.32.

Figure 5A:
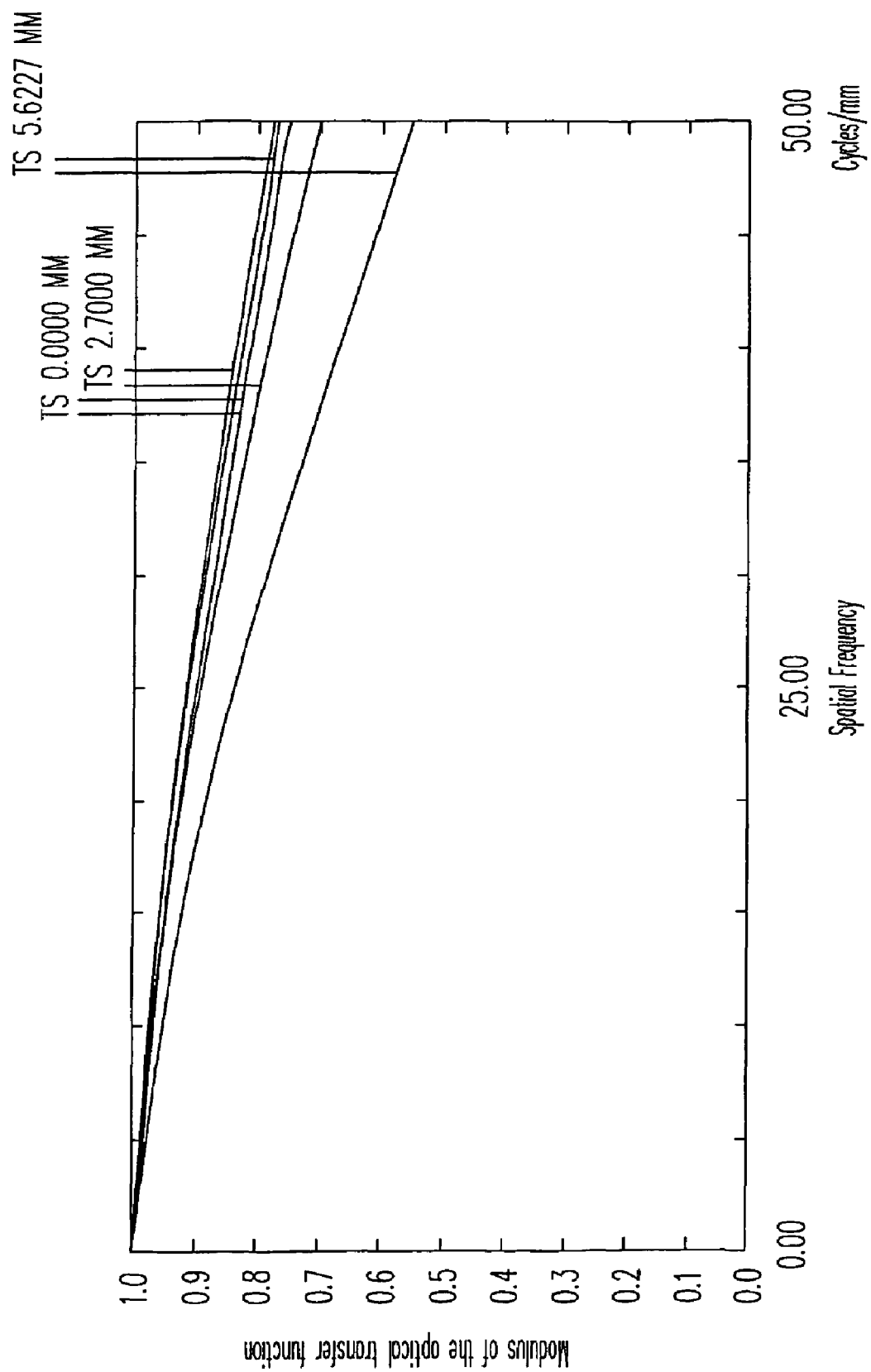
FIGS. 5A to 5C are diagrams showing simulated optical imaging data of the fixed-focus lens in FIG. 4.
Figure 5B:
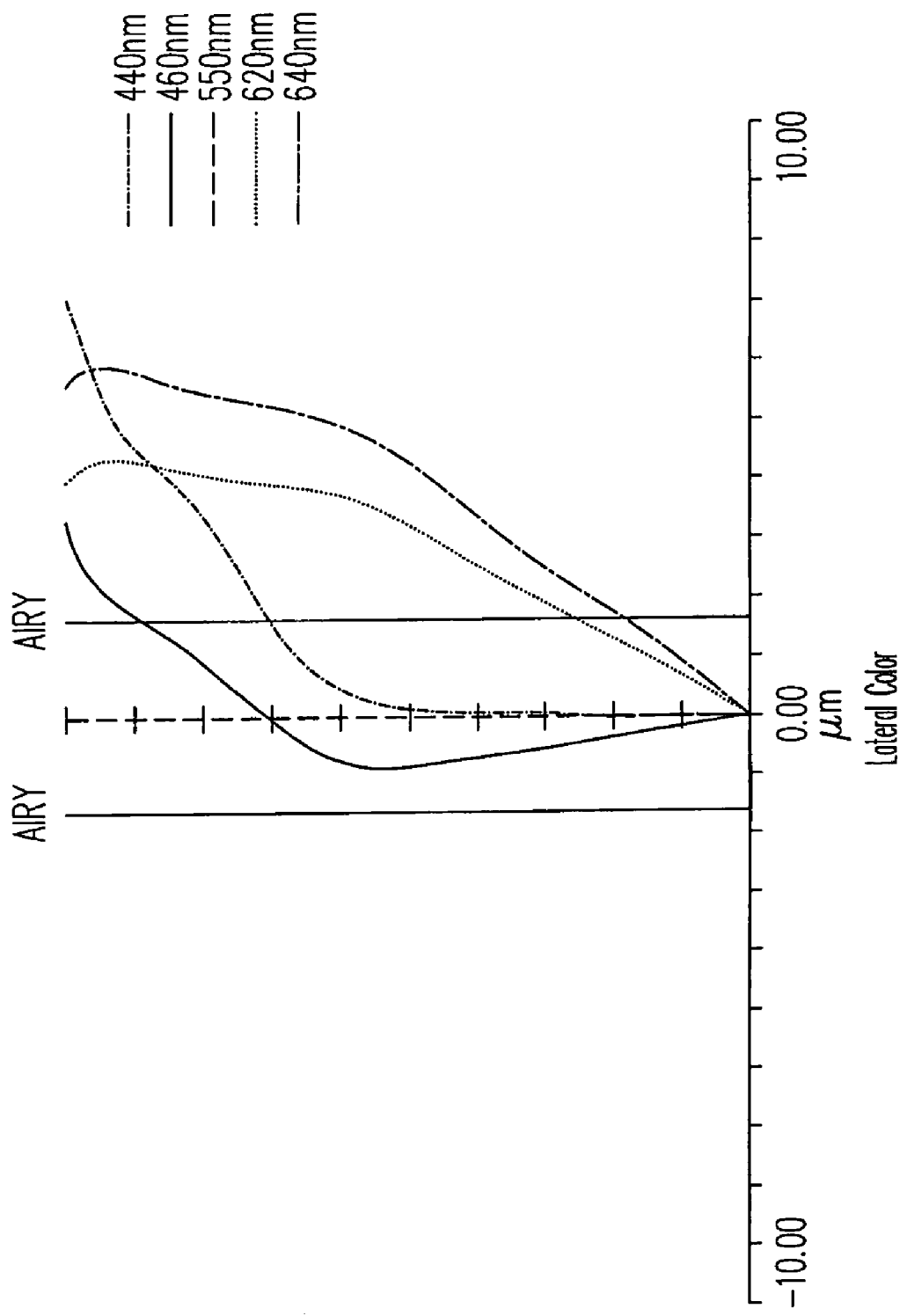
Figure 5C:
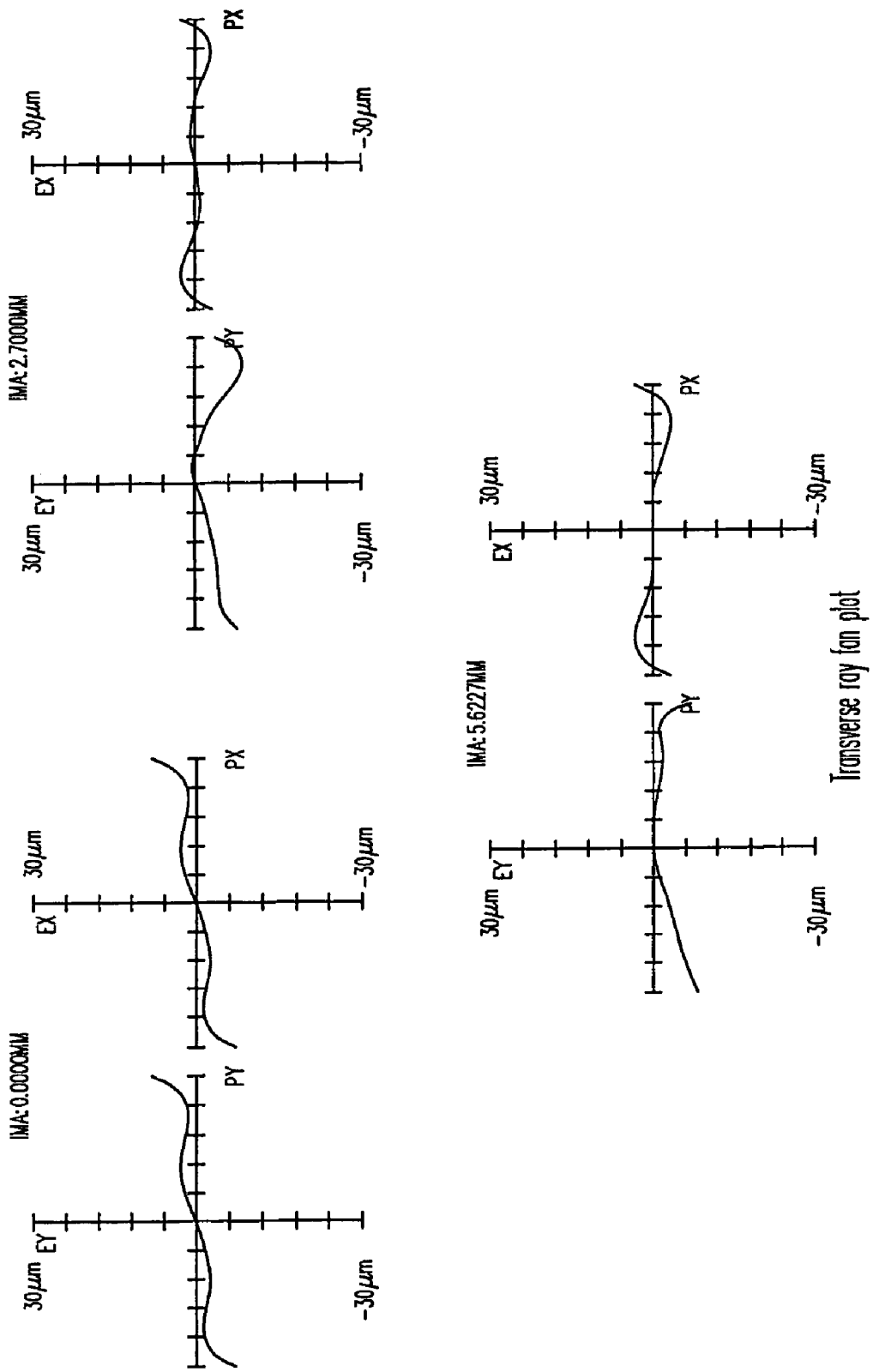

Refer to FIGS. 5A through 5C. FIG. 5A is a graph with MTF curves, wherein the horizontal axis is the spatial frequency in cycles per mm, and the vertical axis is the modulus of the OTF. The simulated data in FIG. 5A is performed by using light having a wavelength between 440 nm~640 nm. FIG. 5B is a lateral color diagram of the image, in which the maximum field is 5.6227 mm, and the reference wavelength is 550 nm. FIG. 5C is a transverse ray fan plot of the image. Because the curves displayed in FIGS. 5A to 5C are within the standard range, the fixed-focus lens 200' of the present embodiment can produce good imaging quality with fewer lenses compared with the conventional technique.

Figure 6:
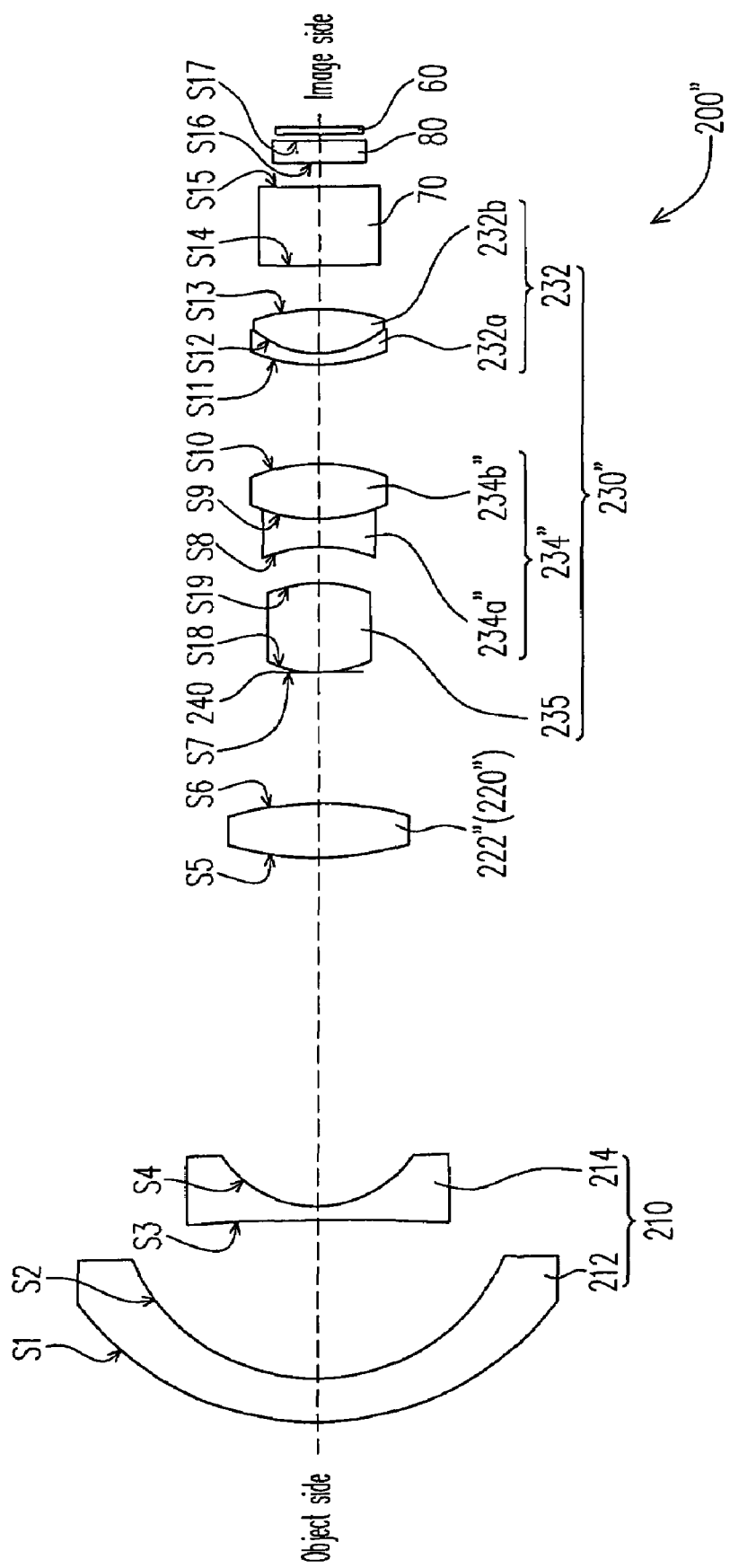
FIG. 6 is a structural diagram of a fixed-focus lens according to yet another embodiment of the present invention.

FIG. 6 is a structural diagram of a fixed-focus lens according to yet another embodiment of the present invention. The fixed-focus lens 200" in the present embodiment is similar to the fixed-focus lens 200' (referring to FIG. 4) except for the following differences. In the fixed-focus lens 200", the eighth lens 235 is disposed at a different location. The eight lens 235 of a third lens group 230" of the fixed-focus lens 200" is located between the second lens group 220" and the second cemented lens 234". In addition, in the fixed-focus lens 200", a second cemented lens 234" includes a sixth lens 234a" and a seventh lens 234b" arranged in sequence from the object side to the image side. The sixth lens 234a" has a negative refractive power, and the seventh lens 234b" has a positive refractive power. In the present embodiment, the sixth lens 234a" is a biconcave lens, and the seventh lens 234b" is a biconvex lens, for example. Furthermore, in the present embodiment, the third lens 222" is a biconvex lens, for example.

In the following, an embodiment of the fixed-focus lens 200" is provided. However, the embodiment is not intended to limit the present invention. Refer to FIG. 6, Table 5 and Table 6.

TABLE 5

| Surface | Radius of Curvature (mm) | Interval (mm) | Refractive Index | Abbe Number | Remarks |
|---|---|---|---|---|---|
| S1 | 70.372 | 4.64 | 1.492 | 57.4 | First lens |
| S2 | 22.527 | 19.26 | | | |
| S3 | −282.211 | 1.99 | 1.743 | 49.3 | Second lens |
| S4 | 15.797 | 58.81 | | | |
| S5 | 72.895 | 8.00 | 1.723 | 38.0 | Third lens |
| S6 | −99.904 | 28.48 | | | |
| S7 | Infinite | 0.49 | | | Aperture Stop |
| S18 | 22.163 | 9.52 | 1.487 | 70.4 | Eighth lens |
| S19 | −28.945 | 2.13 | | | |
| S8 | −19.913 | 5.00 | 1.806 | 33.3 | Sixth lens |
| S9 | 18.941 | 6.51 | 1.497 | 81.6 | Seventh lens |
| S10 | −18.874 | 6.82 | | | |
| S11 | 16.214 | 1.79 | 1.755 | 27.5 | Fourth lens |
| S12 | 14.254 | 3.49 | 1.487 | 70.4 | Fifth lens |
| S13 | −190.584 | 0.91 | | | |
| S14 | Infinite | 10.00 | 1.517 | 64.2 | Total internal reflection prism |
| S15 | Infinite | 3.00 | | | |
| S16 | Infinite | 3.00 | 1.487 | 70.4 | Cover glass |
| S17 | Infinite | 0.48 | | | |

TABLE 6

| Aspheric Parameters | Conic Coefficient k | Coefficient $A_2$ | Coefficient $A_3$ | Coefficient $A_4$ | Coefficient $A_5$ |
|---|---|---|---|---|---|
| S1 | −38.5569 | 2.686819E−05 | −2.962627E−08 | 1.811612E−11 | −1.659044E−15 |
| S2 | −5.24583 | 5.962496E−05 | −5.100202E−08 | −6.755041E−11 | 7.023955E−14 |

In table 5, the surfaces S1~S4, S7 and S11~S19 are the same as those in Table 3. The surfaces S5 and S6 are the two surfaces of the third lens 222". The surface S8 is the surface of the sixth lens 234a" facing the object side, the surface S9 is the connected surface between the sixth lens 234a" and the seventh lens 234b", and the surface S10 is the surface of the seventh lens 234b" facing the image side. In addition, the coefficient Al not listed in Table 6 is 0.

Accordingly, in the fixed-focus lens 200" of the present embodiment, f=5.216 mm, $f_{G1}$=−12.814 mm, $f_{G2}$=59.086 mm, $f_{G3}$=28.181 mm, $f_{L2}$=−19.985, $|f_{G1}/f|$=2.457, $|f_{G2}/f|$=11.328, $|f_{G3}/f|$=5.403, $|f_{L2}/f|$=3.832, 42.9<$|V_p-V_n|$<48.3 and 0.27<$|N_p-N_n|$<0.31.

Figure 7A:
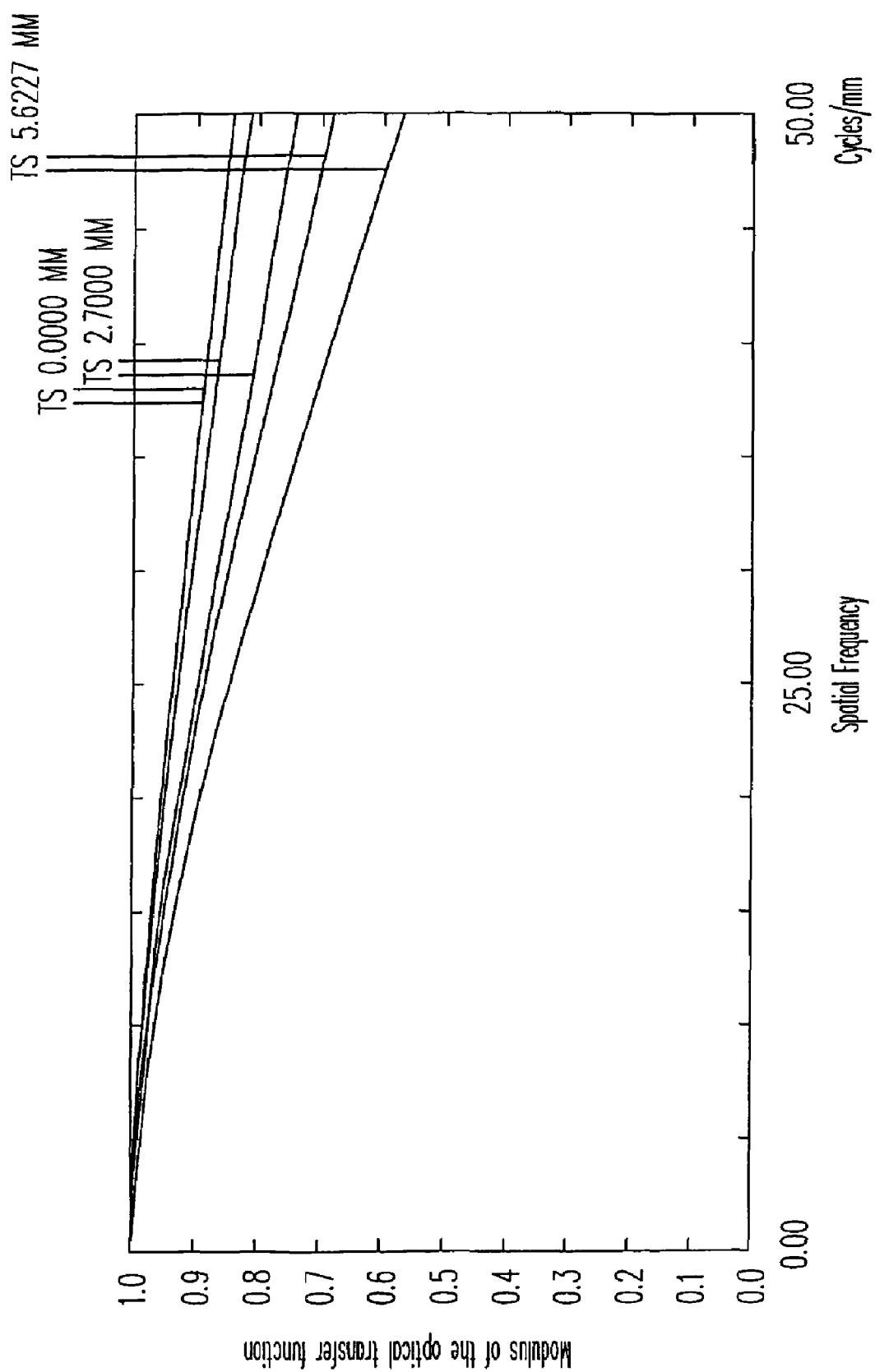
FIGS. 7A to 7C are diagrams showing simulated optical imaging data of the fixed-focus lens in FIG. 6.
Figure 7B:
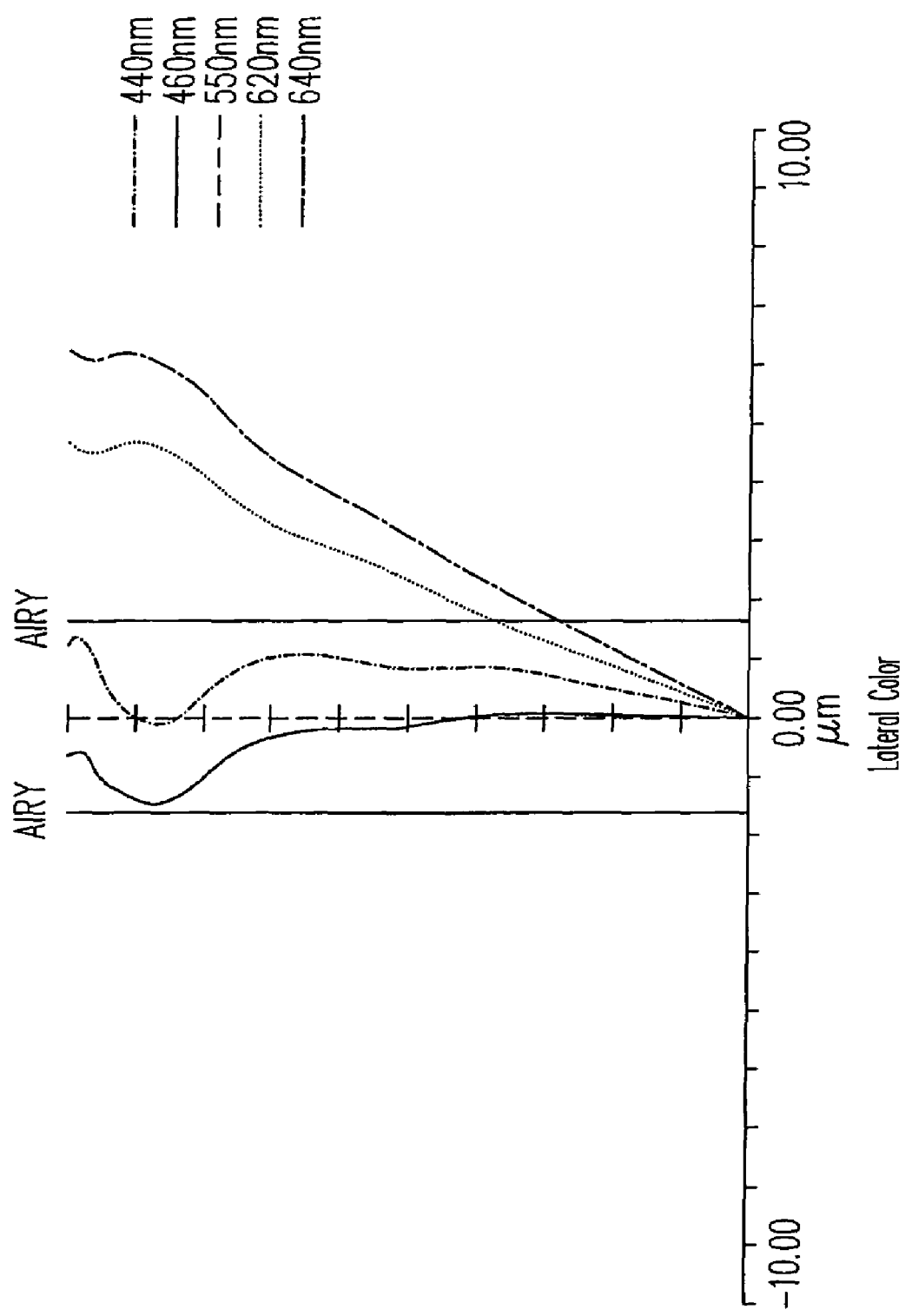
Figure 7C:
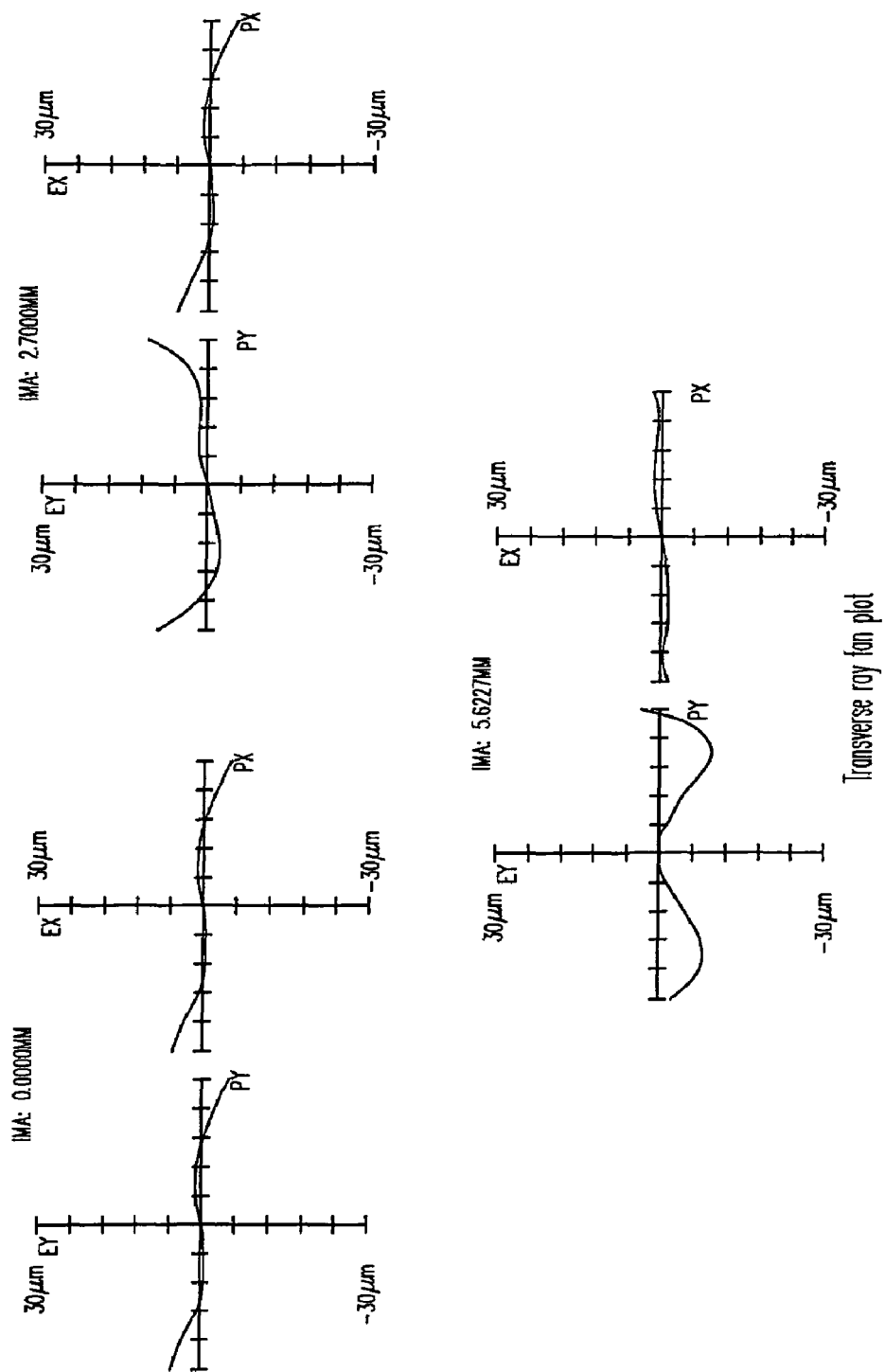

Refer to FIGS. 7A through 7C. FIG. 7A is a graph with MTF curves, wherein the horizontal axis is the spatial frequency in cycles per mm, and the vertical axis is the modulus of the OTF. The simulated data in FIG. 7A is performed by using light having a wavelength between 440 nm~640 nm. FIG. 7B is a lateral color diagram of the image, in which the maximum field is 5.6227 mm, and the reference wavelength is 550 nm. FIG. 7C is a transverse ray fan plot of the image. Because the curves displayed in FIGS. 7A to 7C are within the standard range, the fixed-focus lens 200" of the present embodiment can produce good imaging quality with fewer lenses compared with the conventional technique.

Figure 8:
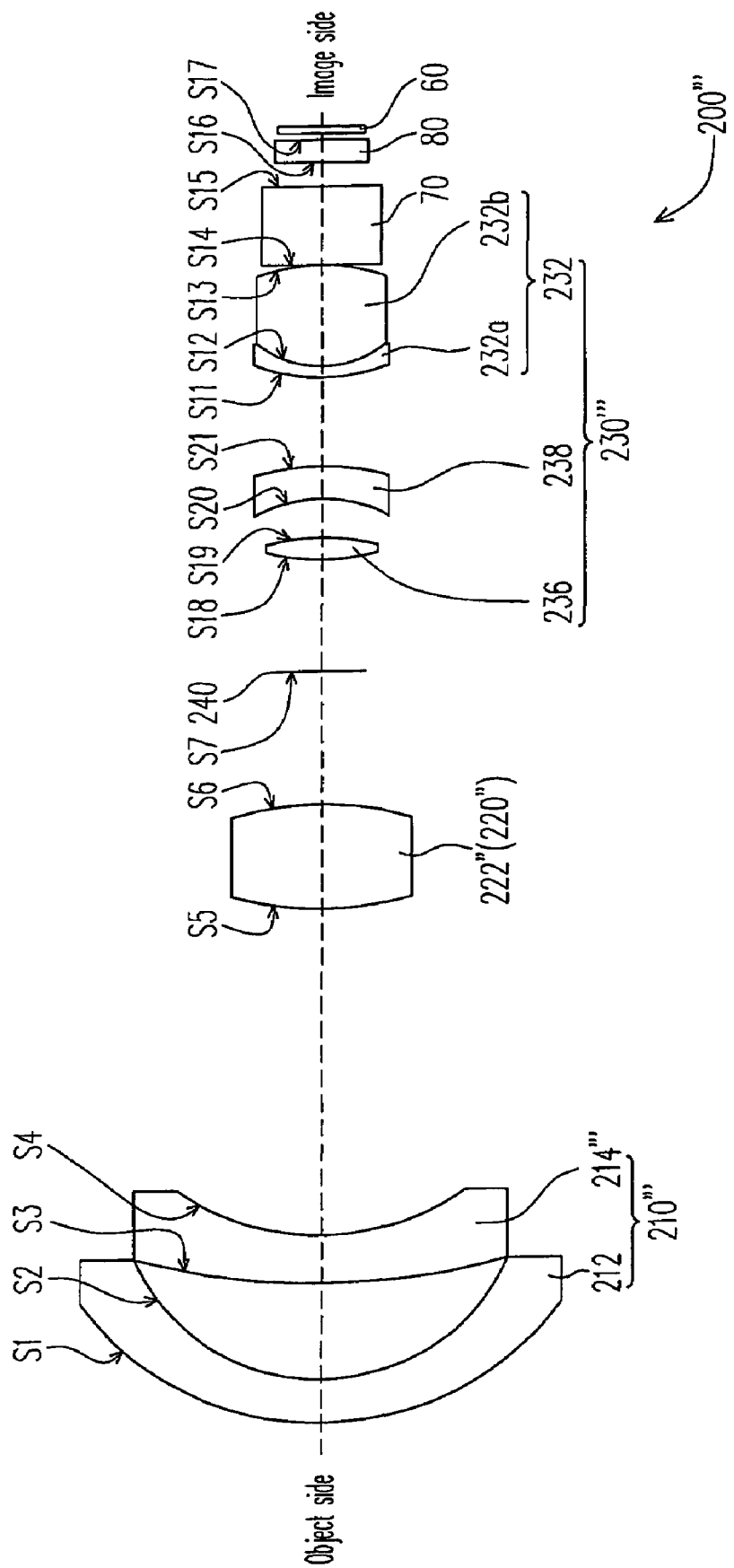
FIG. 8 is a structural diagram of a fixed-focus lens according to still another embodiment of the present invention.

FIG. 8 is a structural diagram of a fixed-focus lens according to still another embodiment of the present invention. A fixed-focus lens 200''' in the present embodiment is similar to the fixed-focus lens 200" (referring to FIG. 6) except for the following differences. In the fixed-focus lens 200''', a third lens group 230''' has only one cemented lens (that is, the first cemented lens 232). In addition, the third lens group 230''' further includes a sixth lens 236 and a seventh lens 238. The lenses of the third lens group 230''' are, in sequence from the object side to the image side, the sixth lens 236, the seventh lens 238, the fourth lens 232a and the fifth lens 232b. The sixth lens 236 has a positive refractive power, and the seventh lens 238 has a negative refractive power, for example.

In the present embodiment, the sixth lens 236 is a biconvex lens, and the seventh lens 238 is a meniscus lens with a convex surface facing the image side. Furthermore, a second lens 214''' of a first lens group 210''' is a negative meniscus lens with a convex surface facing the object side, for example. Moreover, to further ensure the imaging quality of the fixed-focus lens 200''', the fixed-focus lens 200''' of the present embodiment can satisfy the following conditions: (vii) 5.8<$|f_{L4/5}/f|$<7.8, where $f_{L4/5}$ is the effective focal length of the first cemented lens 232.

In the following, an embodiment of the fixed-focus lens 200''' is provided. However, the embodiment is not intended to limit the present invention. Refer to FIG. 8, Table 7 and Table 8.

TABLE 7

| Surface | Radius of Curvature (mm) | Interval (mm) | Refractive Index | Abbe Number | Remarks |
|---|---|---|---|---|---|
| S1 | 74.311 | 3.11 | 1.49 | 57.4 | First lens |
| S2 | 16.497 | 16.83 | | | |
| S3 | 57.326 | 4.46 | 1.74 | 49.3 | Second lens |
| S4 | 19.201 | 74.54 | | | |
| S5 | 141.664 | 13.24 | 1.72 | 38.0 | Third lens |
| S6 | −99.669 | 24.01 | | | |
| S7 | Infinite | 9.87 | | | Aperture Stop |
| S18 | 25.093 | 3.49 | 1.49 | 70.4 | Sixth lens |
| S19 | −24.883 | 3.16 | | | |
| S20 | −18.872 | 4.98 | 1.81 | 33.3 | Seventh lens |
| S21 | −48.040 | 7.95 | | | |
| S11 | 25.416 | 1.29 | 1.76 | 27.5 | Fourth lens |
| S12 | 12.822 | 11.26 | 1.50 | 81.6 | Fifth lens |
| S13 | −25.612 | 0.48 | | | |
| S14 | Infinite | 10.00 | 1.52 | 64.2 | Total internal reflection prism |
| S15 | Infinite | 3.00 | | | |
| S16 | Infinite | 3.00 | 1.49 | 70.4 | Cover glass |
| S17 | Infinite | 0.48 | | | |

TABLE 8

| Aspheric Parameters | Conic Coefficient k | Coefficient $A_2$ | Coefficient $A_3$ | Coefficient $A_4$ | Coefficient $A_5$ |
|---|---|---|---|---|---|
| S1 | −15.2262 | 2.247644E−05 | −2.573840E−08 | 1.582103E−11 | −3.311840E−15 |
| S2 | −2.87085 | 7.436868E−05 | −3.818495E−09 | −4.659757E−11 | 8.693131E−14 |

In table 7, the surfaces S1, S2, S5~S7 and S11~S17 are the same as those in Table 5. The surfaces S3 and S4 are the two surfaces of the second lens 214'''. The surfaces S18 and S19 are the two surfaces of the sixth lens 236. The surfaces S20 and S21 are the two surfaces of the seventh lens 238. In addition, the coefficient $A_1$ not listed in Table 8 is 0.

Accordingly, in the fixed-focus lens 200''' of the present embodiment, f=5.315 mm, $f_{G1}$=−17.005 mm, $f_{G2}$=82.328 mm, $f_{G3}$=30.206 mm, $f_{L2}$=−40.713, $f_{L6/7}$=36.384, $|f_{G1}/f|$=3.2, $|f_{G2}/f|$=15.491, $|f_{G3}/f|$=5.684, $|f_{L2}/f|$=7.661, $|V_p-V_n|$=54.1 and $|N_p-N_n|$=0.26.

Figure 9A:
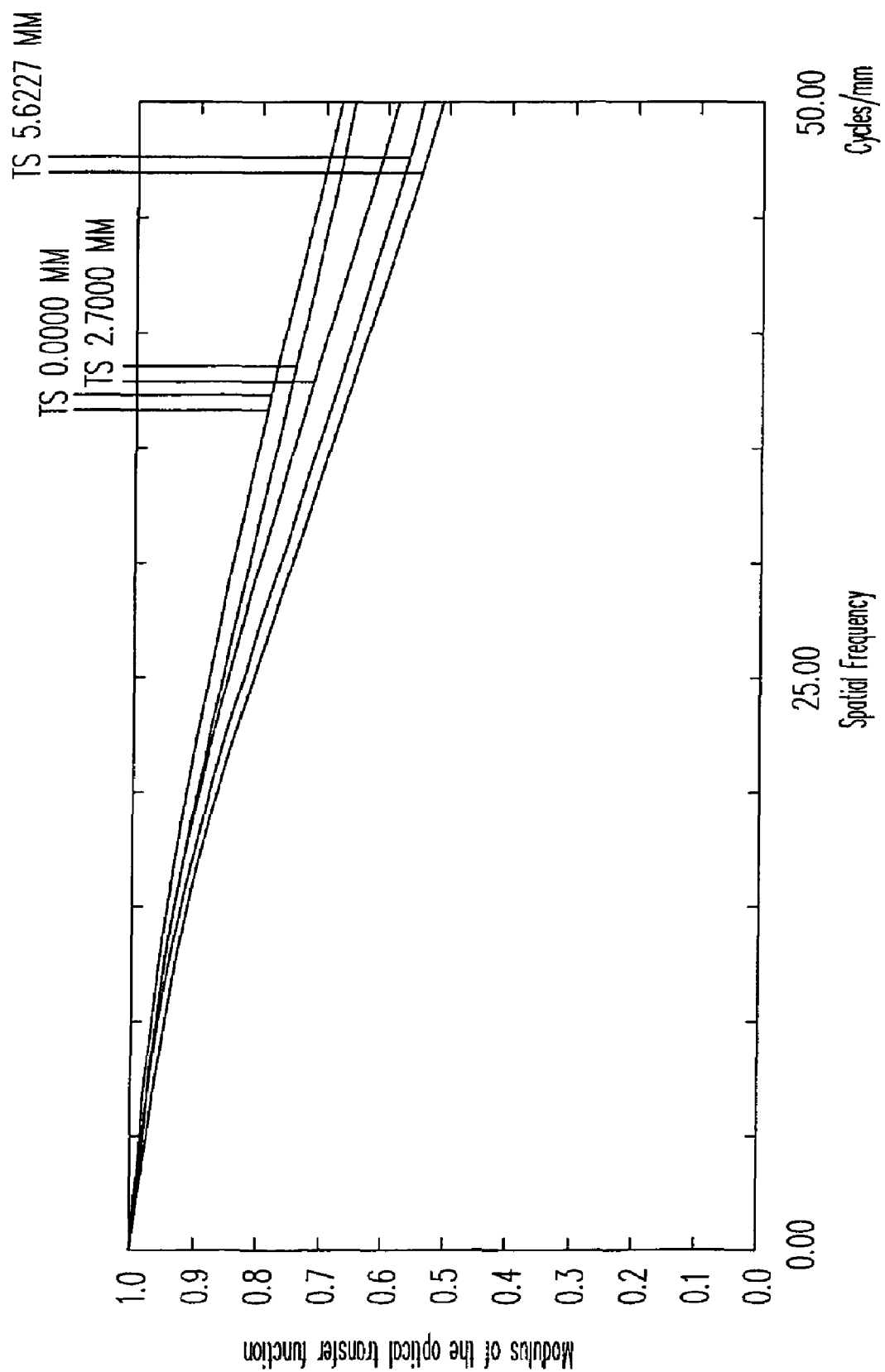
FIGS. 9A to 9C are diagrams showing simulated optical imaging data of the fixed-focus lens in FIG. 8.
Figure 9B:
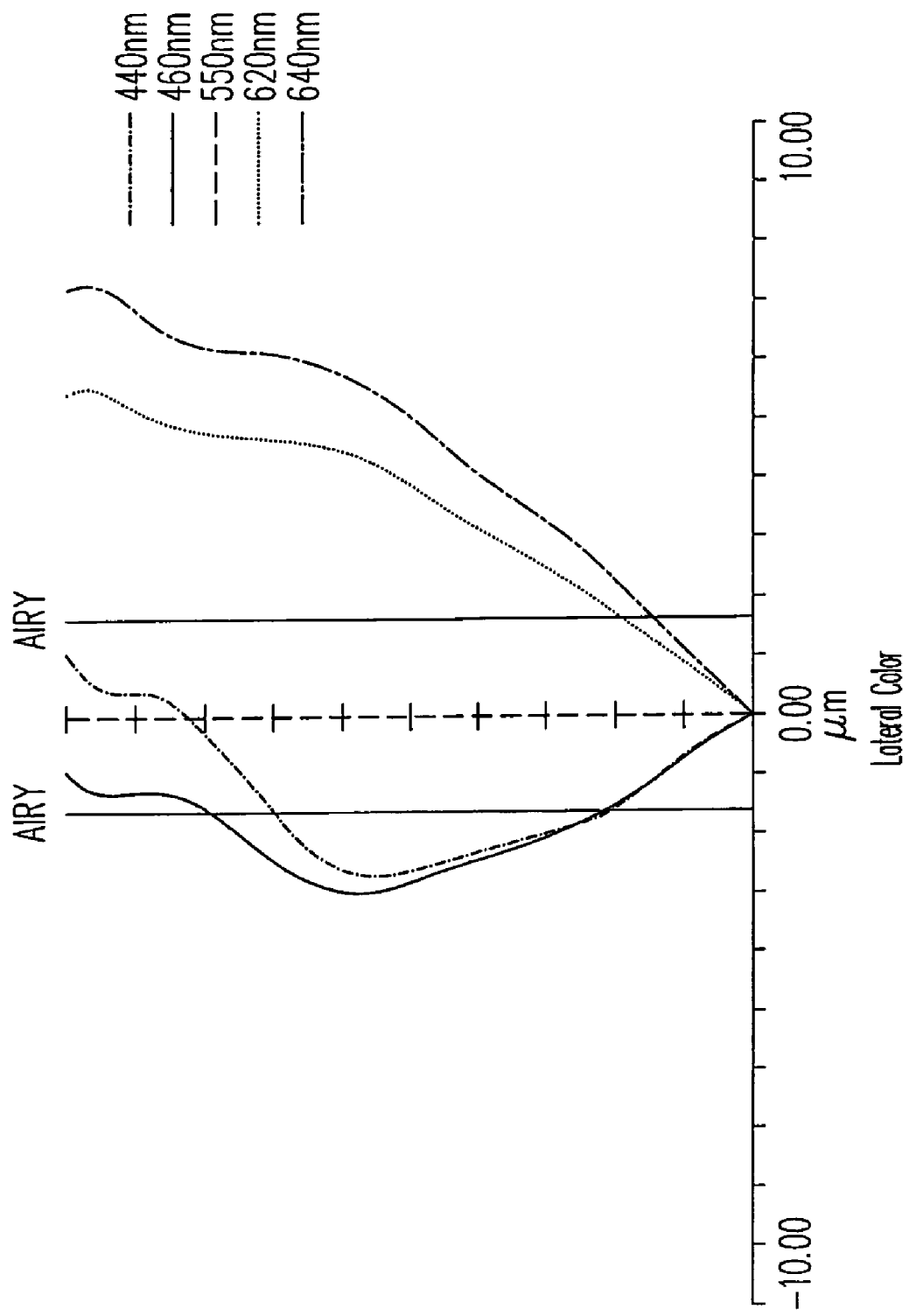
Figure 9C:
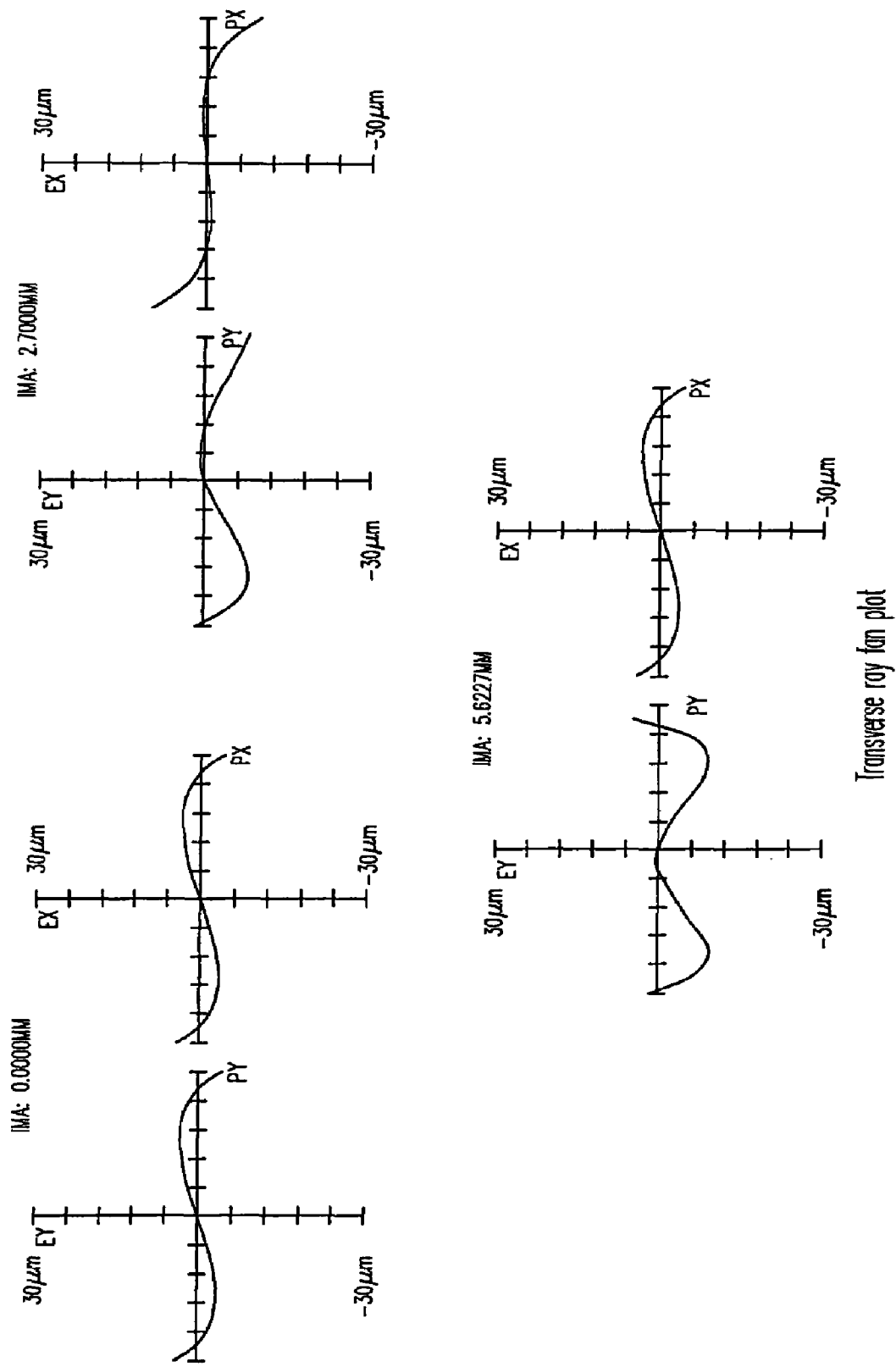

Refer to FIGS. 9A through 9C. FIG. 9A is a graph with MTF curves, wherein the horizontal axis is the spatial frequency in cycles per mm, and the vertical axis is the modulus of the OTF. The simulated data in FIG. 9A is performed by using light having a wavelength between 440 nm~640 nm. FIG. 9B is a lateral color diagram of the image, in which the maximum field is 5.6227 mm, and the reference wavelength is 550 nm. FIG. 9C is a transverse ray fan plot of the image. Because the curves displayed in FIGS. 9A to 9C are within the standard range, the fixed-focus lens 200''' of the present embodiment can produce good imaging quality with fewer lenses compared with the conventional technique.

Figure 10:
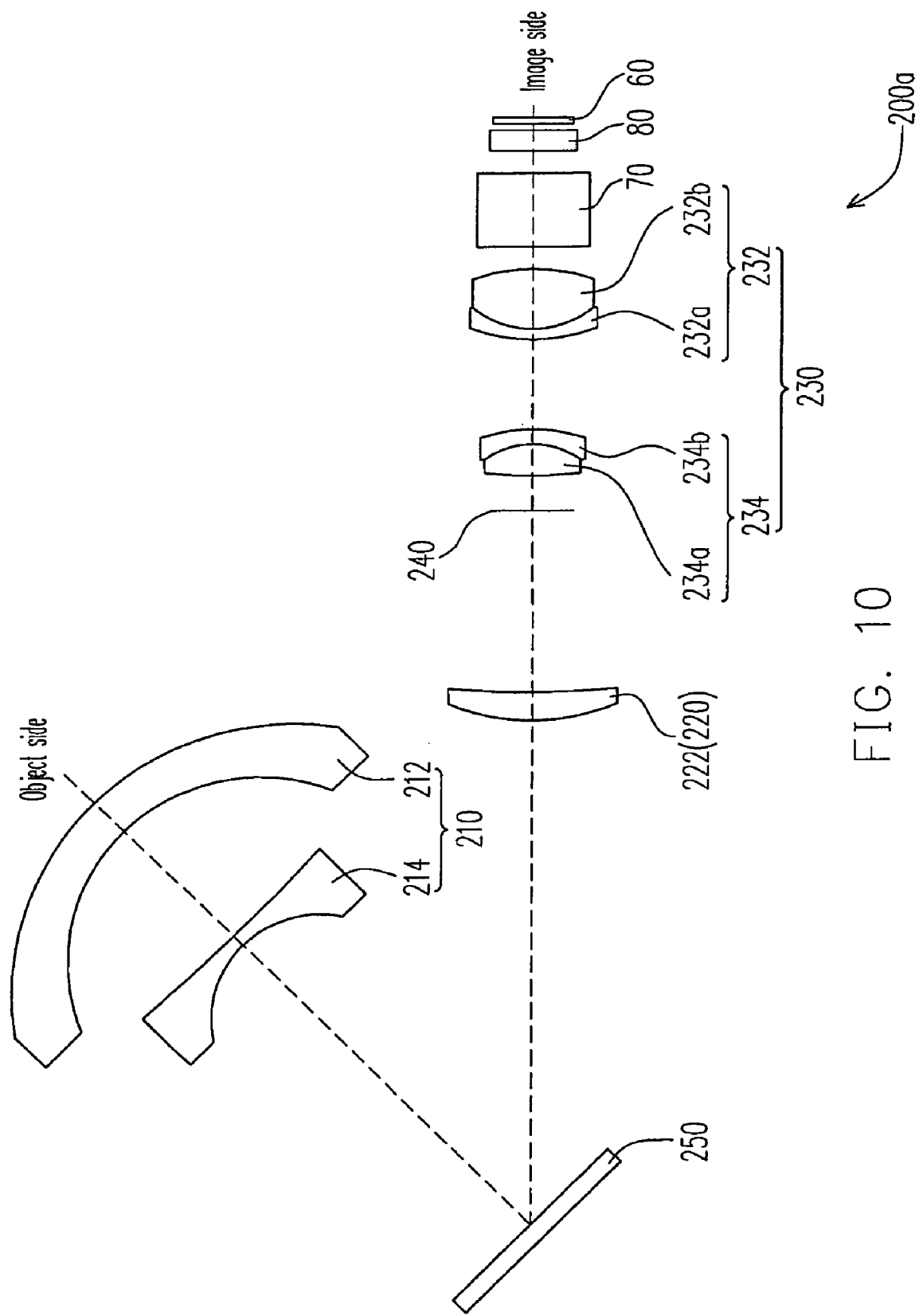
FIG. 10 is a structural diagram of a fixed-focus lens according to yet still another embodiment of the present invention.

FIG. 10 is a structural diagram of a fixed-focus lens according to yet still another embodiment of the present invention. As shown in FIG. 10, a fixed-focus lens 200a of the present embodiment is similar to the fixed-focus lens 200 (referring to FIG. 2) except for the following difference. The fixed-focus lens 200a in the present embodiment further includes a reflector 250 disposed between the first lens group 210 and the second lens group 220 for reflecting the light from the second lens group 220 to the first lens group 210. In other words, the fixed-focus lens 200a is an L-type lens. Because the fixed-focus lens 200a has a shorter length, the fixed-focus lens 200a can be employed in a rear projection television (RPTV) to reduce the thickness of the RPTV. It should be noted that the reflector 250 can also be applied to the fixed-focus lenses 200', 200" and 200''' to produce another three L-type lenses.

In summary, the fixed-focus lens according to the embodiments of the present invention combines an aspheric lens (i.e. the first lens) with six other lenses (i.e. the second lens to the seventh lens) or with seven other lenses (i.e. the second lens to the eighth lens) to achieve the effect of reducing aberration and produce good imaging quality. Compared with the conventional fixed-focus lens having thirteen lenses, the fixed-focus lens according to the embodiments of the present invention uses fewer lenses, so as to reduce the material cost of the lenses. Moreover, all the other lenses except the first lens can be spherical lenses, so that the production cost of the fixed-focus lens is further reduced.

In addition, overall volume of the fixed-focus lens according to the embodiments of the present invention is smaller because the total number of lenses in the fixed-focus lens is smaller. Therefore, when the fixed-focus lens is applied to a rear projection television (RPTV), the volume of the RPTV can be reduced. Furthermore, the fixed-focus lens can be an L-type lens. As a result, the total length of the fixed-focus lens is further reduced, and the thickness of the RPTV using the fixed-focus lens is smaller.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
a first lens group, having a negative refractive power and comprising a first lens and a second lens arranged in sequence from an object side to an image side, wherein both the first lens and the second lens have negative refractive powers, and the first lens is an aspheric lens;
a second lens group, disposed between the first lens group and the image side and having a positive refractive power, wherein the second lens group comprises a third lens having a positive refractive power; and
a third lens group, disposed between the second lens group and the image side and having a positive refractive power, wherein the third lens group comprises at least one first cemented lens, wherein the fixed-focus lens satisfies $1.2<|f_{G1}/f|<4.2$, $2.8<|f_{L2}/f|<8.6$, and $6.8<|f_{G2}/f|<18.0$, where $f_{G1}$ is an effective focal length of the first lens group, $f_{G2}$ is an effective focal length of the second lens group, $f_{L2}$ is an effective focal length of the second lens, and f is an effective focal length of the fixed-focus lens.

2. The fixed-focus lens according to claim 1, wherein the first lens is a meniscus lens having a convex surface facing the object side, and the second lens is a biconcave lens or a meniscus lens having a convex surface facing the object side.

3. The fixed-focus lens according to claim 1, wherein the fixed-focus lens satisfies $4.0<|f_{G3}/f|<6.3$ where $f_{G3}$ is an effective focal length of the third lens group.

4. The fixed-focus lens according to claim 1, wherein the third lens is a biconvex lens or a meniscus lens having a convex surface facing the object side.

5. The fixed-focus lens according to claim 1, wherein the first cemented lens comprises a fourth lens and a fifth lens arranged in sequence from the object side to the image side, and refractive powers of the fourth lens and the fifth lens are negative and positive respectively.

6. The fixed-focus lens according to claim 5, wherein the fixed-focus lens satisfies $27<|V_p-V_n|<55$ where $V_p$ is an Abbe number of the fifth lens, and $V_n$ is an Abbe number of the fourth lens.

7. The fixed-focus lens according to claim 5, wherein the fixed-focus lens satisfies $0.24<|N_p-N_n|<0.33$ where $N_p$ is a refractive index of the fifth lens, and $N_n$ is a refractive number of the fourth lens.

8. The fixed-focus lens according to claim 5, wherein the fourth lens is a meniscus lens having a convex surface facing the object side, and the fifth lens is a biconvex lens.

9. The fixed-focus lens according to claim 5, wherein the third lens group further comprises a sixth lens and a seventh lens; the sixth lens, the seventh lens, the fourth lens and the fifth lens of the third lens group are arranged in the sequence from the object side to the image side; the sixth lens has a positive refractive power; and the seventh lens has a negative refractive power.

10. The fixed-focus lens according to claim 9, wherein the fixed-focus lens satisfies $5.8<|f_{L4/5}/f|<7.8$ where $f_{L4/5}$ is an effective focal length of the first cemented lens.

11. The fixed-focus lens according to claim 9, wherein the sixth lens is a biconvex lens, and the seventh lens is a meniscus lens having a convex surface facing the image side.

12. The fixed-focus lens according to claim 1, wherein the third lens group further comprises a second cemented lens located between the second lens group and the first cemented lens, and the second lens group comprises a sixth lens and a seventh lens arranged in sequence from the object side to the image side.

13. The fixed-focus lens according to claim 12, wherein the fixed-focus lens satisfies $27<|V_p-V_n|<55$ where $V_p$ is an Abbe number of the lens having a positive refractive power in the second cemented lens, and $V_n$ is an Abbe number of the lens having a negative refractive power in the second cemented lens.

14. The fixed-focus lens according to claim 12, wherein the fixed-focus lens satisfies $0.24<|N_p-N_n|<0.33$ where $N_p$ is a refractive index of the lens having a positive refractive power in the second cemented lens, and $N_n$ is a refractive index of the lens having a negative refractive power in the second cemented lens.

15. The fixed-focus lens according to claim 12, wherein refractive powers of the sixth lens and the seventh lens are positive and negative respectively, the sixth lens is a biconvex lens, and the seventh lens is a meniscus lens having a convex surface facing the image side.

16. The fixed-focus lens according to claim 12, wherein the third lens group further comprises an eighth lens located between the second cemented lens and the first cemented lens, and the eighth lens has a positive refractive power.

17. The fixed-focus lens according to claim 16, wherein refractive powers of the sixth lens and the seventh lens are positive and negative respectively, the sixth lens is a biconvex lens, the seventh lens is a biconcave lens, and the eighth lens is a biconvex lens.

18. The fixed-focus lens according to claim 12, wherein the third lens group further comprises an eighth lens located between the second lens group and the second cemented lens, and the eighth lens has a positive refractive power.

19. The fixed-focus lens according to claim 18, wherein refractive powers of the sixth lens and the seventh lens are negative and positive respectively, the sixth lens is a biconcave lens, the seventh lens is a biconvex lens, and the eighth lens is a biconvex lens.

20. The fixed-focus lens according to claim 1, further comprising a reflector disposed between the first lens group and the second lens group for reflecting light from the second lens group to the first lens group.

21. The fixed-focus lens according to claim 1, further comprising an aperture stop disposed between the second lens group and the third lens group.

* * * * *